Patented Mar. 17, 1931

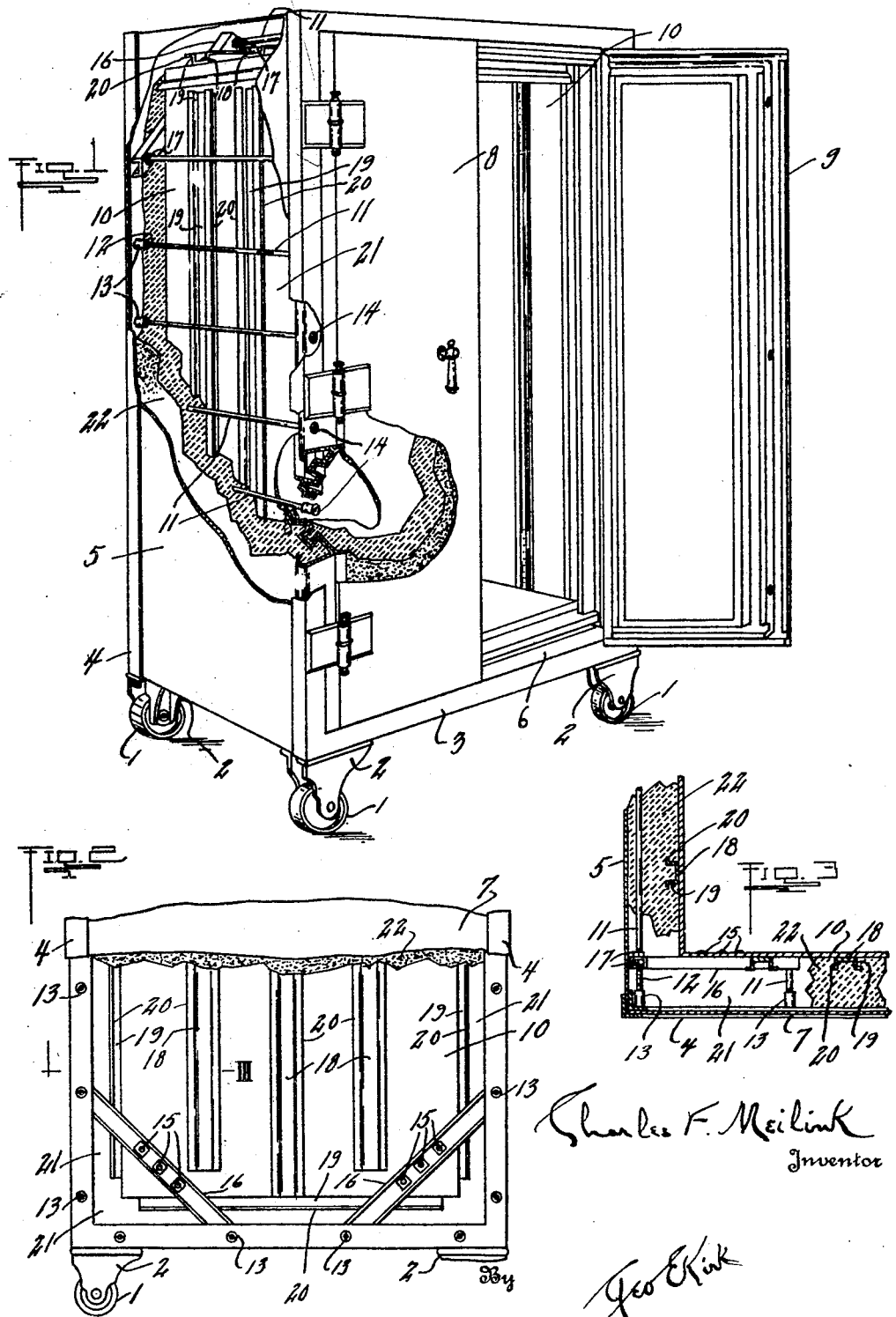

1,796,385

UNITED STATES PATENT OFFICE

CHARLES F. MEILINK, OF TOLEDO, OHIO, ASSIGNOR TO THE MEILINK STEEL SAFE COMPANY, OF TOLEDO, OHIO, A CORPORATION OF OHIO

SAFE-DOUBLE-WALL STRUCTURE

Application filed April 28, 1927. Serial No. 187,199.

This invention relates to double wall structures, especially with filler therebetween.

This invention has utility when incorporated in safes.

Referring to the drawings:

Fig. 1 is a perspective view, with parts broken away, of an embodiment of the invention in a safe;

Fig. 2 is a fragmentary rear view of the safe of Fig. 1; and

Fig. 3 is a partial section on the line III—III, Fig. 2.

Supporting wheels 1 are shown as mounted in brackets 2 carried by frames 3, 4, for outer housing 5 of a safe. This outer housing 5 extends entirely about the safe between front opening 6 and safe housing back wall 7. The front opening 6 is closed by doors 8, 9. This safe is provided with inner housing 10 spaced from the outer housing 5. These outer housing frame members 3, 4, are secured together by bolts 11 having threaded portions 12 coacting with internally threaded sleeves or nuts 13, 14, in the frames 4, 3.

Bolts 15 coacting with channel iron 16 mounts such iron diagonally at a corner of the inner housing 10 to have the channel iron 16 extend beyond the inner housing 10 to be engaged by nuts 17 on the bolts 11. Additionally this inner housing 10 has channel irons 18 anchored against the outer portions of the walls of this inner housing 10. This assembly, say by spot welding at points more or less in close proximity along the inner housing 10 serves as stiffening means for such inner housing, which stiffening is supplemented by the channel sides 19 and similar termini outwardly extending flanges 20. These channel irons 16, 18, are in chamber 21 between the inner housing 10 and the outer housing 5 in which chamber is an insulation filler 22 say of a plastic material. These stiffening or reinforcing channel irons as well as location channel irons for the inner housing 10 materially strengthen such inner housing 10 as to the outer housing for maintaining the spacing therebetween for the chamber 21 and as distributed serve as embedded anchoring or reinforcing means coacting with the insulation filler in which these channel irons are inserted. This is to the end that in extreme instances of safe abuse there is maintained location of the filler against shifting as to the inner housing. Additionally the channel irons directly materially strengthen the light gauge inner housing 10. The result is with such a stiff or strengthened inner housing even the outer housing 5, is given a material increase in rigidity against instances of extreme abuse.

The filler 22 is preferably a fire resistant inorganic material say carrying diatomaceous earth and magnesia. The reinforcement of this material introduced as plastic and taking a cast or set in the chamber 21 has the physical strength thereon materially increased especially in the coactions between the housings.

What is claimed and it is desired to secure by Letters Patent is:

1. A safe having inner and outer housings providing a chamber therebetween, a filler in said chamber, diagonally extending channel irons adjacent corners of the inner housing, and rods carried by the outer housing with which said channel irons are anchored and embedded in the filler.

2. A safe having inner and outer housings providing a chamber therebetween, a filler in said chamber, inner housing wall outer side stiffening means extending into the filler chamber spaced from the outer housing and embedded in said filler, the major extent of said stiffening means being along the flat side regions of the inner housing and clear of the corners of said inner housing, and anchoring means apart from the filler securing said stiffening means directly to the outer side of the inner housing and to the inner side of the outer housing.

3. A safe having inner and outer housings providing a chamber therebetween, a filler in said chamber, projecting ribs extending along the inner housing's outer side in said chamber spaced from the outer housing and embedded in said filler, the major extent of said ribs being along the flat side regions of the inner housing and clear of the corners of said housing, and anchoring means apart from the filler directly securing said ribs to the outer side of the inner housing and to the inner side of the outer housing.

4. A safe having inner and outer housings providing a chamber therebetween, a filler in said chamber, filler supplemental anchoring and inner housing wall stiffening channel irons mounted on the outer side of the inner housing spaced from the outer housing and embedded in said filler, the major extent of said channel irons being along the flat side regions of the inner housing and clear of the corners of said housing, and anchoring means apart from the filler directly securing said channel irons to the outer side of the inner housing and to the inner side of the outer housing.

5. A safe having inner and outer housings providing a chamber therebetween, a filler in said chamber, filler supplemental anchoring and inner housing wall stiffening terminally outwardly flanged channel irons mounted on the outer side of the inner housing spaced from the outer housing and embedded in said filler, the major extent of said channel irons being along the flat side regions of the inner housing and clear of the corners of said housing, and anchoring means apart from the filler directly securing said channel irons to the outer side of the inner housing and to the inner side of the outer housing.

In witness whereof I affix my signature.

C. F. MEILINK.